Aug. 21, 1945. W. A. FLUMERFELT 2,383,378
JOINT CONSTRUCTION
Filed Nov. 8, 1941

INVENTOR
William A. Flumerfelt
BY
Braselton, Whitcomb Davies

Patented Aug. 21, 1945

2,383,378

UNITED STATES PATENT OFFICE 2,383,378

JOINT CONSTRUCTION

William A. Flumerfelt, Columbus, Ohio, assignor to The Columbus Auto Parts Company, Columbus, Ohio, a corporation of Ohio Application November 8, 1941, Serial No. 418,295

3 Claims. (Cl. 280—95)

This invention relates to tie rod and joint arrangement and more particularly to a construction of ball joint and tie rod arrangement for connecting the dirigible or steerable wheels of a vehicle together.

The invention contemplates the provision of an arrangement wherein a joint housing is carried by or associated with a steering knuckle, the ball configuration of the joint structure being carried directly upon a tie rod.

The invention embraces the provision of an articulated joint arrangement wherein the ball structure of the joint is directly carried by a tie rod whereby the number of component elements making up the joint assembly or connection between the steering knuckle and tie rod are reduced to a minimum.

A further object of the invention resides in the provision of a ball joint housing integrally formed with means associated with the steering knuckle and the ball stud assembly forming an element of the joint structure carried directly upon a tie rod tube in a manner greatly simplifying assembly of the arrangement and resulting in greater compactness of the means connecting the tie rod with the steering knuckle.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

While I have shown the arrangement of my invention as embodied in a form particularly adaptable for connecting the dirigible wheels of an automotive vehicle together, it is to be understood that I contemplate the use of the invention wherever the same may be found to have utility.

Figure 1:
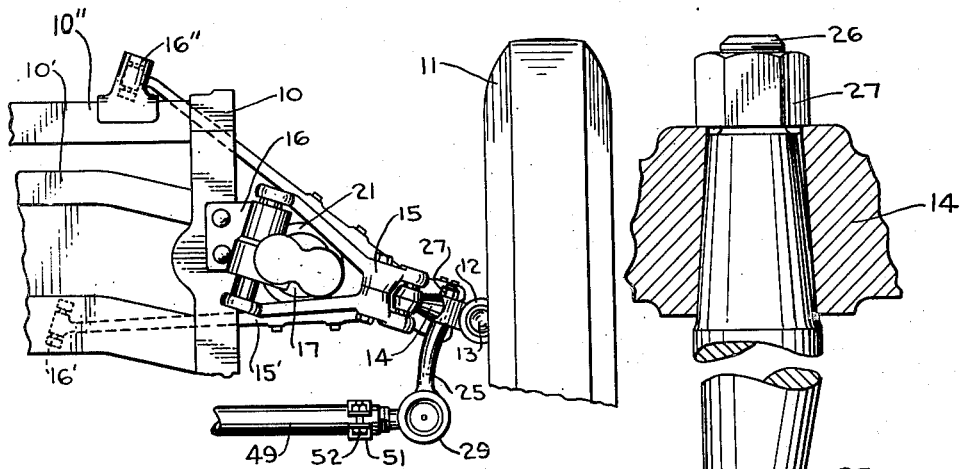
Figure 1 is a top plan view illustrating a forward portion of an automotive vehicle chassis showing the tie rod and joint arrangement of my invention.

Referring to the drawing and particularly Figure 1, there is illustrated the chassis portion of a vehicle frame and under-carriage construction including a dirigible road wheel and illustrating an embodiment of my invention.

The longitudinal extending frame members 10 of the chassis are connected together by means of transverse member 10'. The steerable or dirigible wheels 11 of the vehicle (one of which is shown in Figure 1) are journalled upon suitable wheel supporting spindles or members 12, each spindle being pivotally supported by means of a king pin 13 upon a knuckle or element 14, the knuckle in turn being pivotally connected at its ends to links 15 and 15', these links being located one above the other. The inner end of the upper link 15 is connected to the frame member 10 by means of a bracket 16 and the inner ends of lower link 15' are connected to brackets 16' and 16" carried respectively by the transverse members 10' and 10". Interposed between the lower link 15' and an abutment plate 17 secured to and extending laterally from the frame member 10 is a coil spring 21 which serves to resiliently support the frame construction of the vehicle. While Figure 1 illustrates a right hand wheel and supporting construction of the vehicle as above described, it is to be understood that the left hand dirigible wheel is similarly connected to the frame.

Each steering knuckle 14 is provided with a tapered opening arranged to receive a knuckle arm or member 25 formed with a threaded tenon 26 arranged to receive a nut 27 for securely holding the arm to the knuckle. The arm 25 extends rearwardly and at its extremity is integrally formed with an enlarged circular hollow housing 29. The housing is formed interiorly with a cylindrical bore, the lower portion of the housing being formed with an inwardly extending flange 31. Positioned within the bore in the housing is a pair of bearing elements 32 and 33 having exterior curved wall portions fitting the cylindrical interior walls of the housing. Extending into the housing is a stud member 34 generally of L-shaped configuration and having at one extremity positioned within the housing a semi-spherically shaped portion 35 and positioned above the portion 35 of the stud member is an inverted cup-like member 36 of semi-spherical configuration which with the exterior spherically shaped walls of the enlarged end of the stud member form together a substantially ball-shaped configuration forming the ball element of the joint. The extremity of the stud member is provided with an annular projection or flange 37 which is adapted for engagement with an inner cylindrical wall portion 38 of the cup member 36 to maintain an aligned condition between the cup member and the enlarged portion 35 of the stud member 34. The upper portion of the housing 29 is provided with a closure plate 39 formed with a central concave portion 40, the curvature of the inner surface thereof being of the same radius as that of the exterior spherical surface of the cup member 36 so that during movement of the stud member 34 the concave portion 40 of the closure plate will snugly fit the exterior spherical surface of the cup member 36. Interposed between a flattened portion 41 of the cup member and a recess 42 formed in the interior central portion of the ball portion 35 of the stud member is an expansive coil spring 43, which serves to urge the spherical surfaces of the ball portion 35 and the cup portion 36 into engagement with the bearing seats 32 and 33 to maintain the elements of the joint structure at all times in close frictional engagement and at the same time automatically compensate for any wear of the bearing surfaces.

The closure plate 39 is provided with an opening to receive a fitting 45 for the purpose of providing for the injection of lubricant into the joint structure.

The stud member 34 is formed with a body portion 46 terminating in a threaded tenon portion 47, the body and tenon portion being arranged substantially at right angles to the axis of the ball portion 35 and housing 29 of the joint structure. The threaded tenon 47 of the stud member is received into an interiorly threaded end of a tubular tie rod member 49 the latter being or provided with a kerf as at 50, this portion of tie rod being surrounded by a U-shaped clamp 51 which may be drawn into close engagement with the tie rod by means of a clamping bolt 52 so as to establish a secure connection between threaded portion 47 of the stud member and the tie rod. It is to be understood that clamp 51 may be released through manipulation of the bolt 52 and by rotating the tie rod with respect to the threaded portion 47 of the stud member an adjustment may be had between the joint structure and the tie rod 49. It is to be noted that the inner walls 44 of the inwardly extending flange 31 of the housing are tapered downwardly and outwardly to provide for ample clearance for relating angular movement of the ball stud with respect to the housing.

The radius of curvature at 54 joining the ball portion to the body portion of the stud member is such as to permit the passage through the housing of the body portion and threaded portions of the stud member during assembly, the stud member being assembled through the housing from above. After the stud member, the bearing seats 32 and 33, cup member 36 and spring 43 are in assembled relationship, the closure 39 is placed in position above the cup member 36 and an annular portion of the housing swaged over the edge of the closure plate as indicated at 55 to hold the joint elements in their proper relationship.

Figure 3:
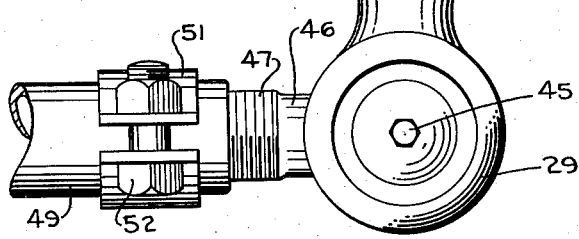
Figure 3 is a top plan view of the arrangement shown in Figure 2.
Figure 2:
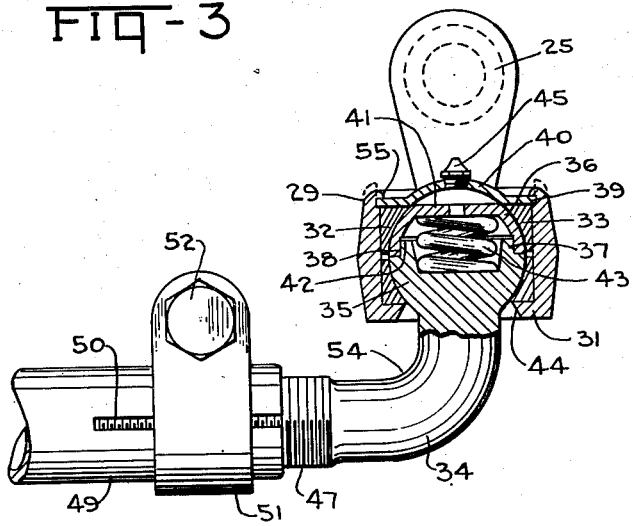
Figure 2 is an elevational view with the joint construction shown in section of the arrangement of steering knuckle arm, tie rod and joint assembly.

In an arrangement of my invention as above described, the housing for the joint structure is formed as an integral part of the knuckle arm and the stud member being of L-shape is carried directly upon the tie rod thus eliminating an independent joint housing which has heretofore been conventional practice. In the arrangement as disclosed with the stud member of the joint depending from the joint housing, any foreign matter, such as water, which may lodge adjacent the opening formed by the flange 31 will not enter the joint structure because of the inverted position of the stud member. Moreover, the upper portion of the housing being closed, foreign matter cannot enter at the upper portion of the housing structure. It is to be understood that the knuckle arm 25 may be formed as an integral part of the steering wheel supporting spindle structure instead of being a separable element as illustrated in Figures 1 and 3.

It is apparent that, within the scope of the invention, modifications and different arrangements may be made other than is herein disclosed, and the present disclosure is illustrative merely, the invention comprehending all variations thereof.

What I claim is:

1. A ball joint including in combination, the boss of the steering knuckle of a vehicle wheel, said boss formed into a ball joint housing integrally connected with said steering knuckle; spherically shaped ball seats within said housing; openings at the top and bottom of said housing; an integral ball stud and ball having the ball thereof located within said ball seats and the stud extending outside said housing through one of the openings therein, said ball being larger than one of said openings and smaller than the other and said stud having a portion bent at an angle and provided with means to secure the same to a tie rod; means to close one of said openings in said housing; and resilient means located within the housing to maintain said ball and ball seats in contact and to compensate for wear.

2. A ball joint including in combination, the boss of the steering knuckle of a vehicle wheel, said boss formed into a ball joint housing integrally connected with said steering knuckle; spherically shaped ball seats within said housing; openings at the top and bottom of said housing; an integral ball stud and ball having the ball thereof located within said ball seats and the stud extending outside said housing through the bottom opening thereof, said ball being larger than said opening and said stud being located at an angle to and provided with means to secure the same to a tie rod; means to close the upper opening in said housing; and resilient means located within the housing to maintain said ball and ball seats in contact and to compensate for wear.

3. A ball joint including in combination, the boss of the steering knuckle of a vehicle wheel, said boss formed into a ball joint housing integrally connected with said steering knuckle; ball seats located within said housing; openings at the top and bottom of said housing, the opening at the top being larger than the opening at the bottom; an integral ball stud and ball having the ball thereof located within said ball seats and the stud extending outside said housing through the bottom opening therein, said ball being larger than said bottom opening and smaller than the other opening in said housing and said stud being located at an angle to and provided with means to secure the same to a tie rod, a closure for the top of the opening in said housing and resilient means located within the housing to maintain said ball and ball seats in contact and to compensate for wear.

WILLIAM A. FLUMERFELT.